Patented July 7, 1942

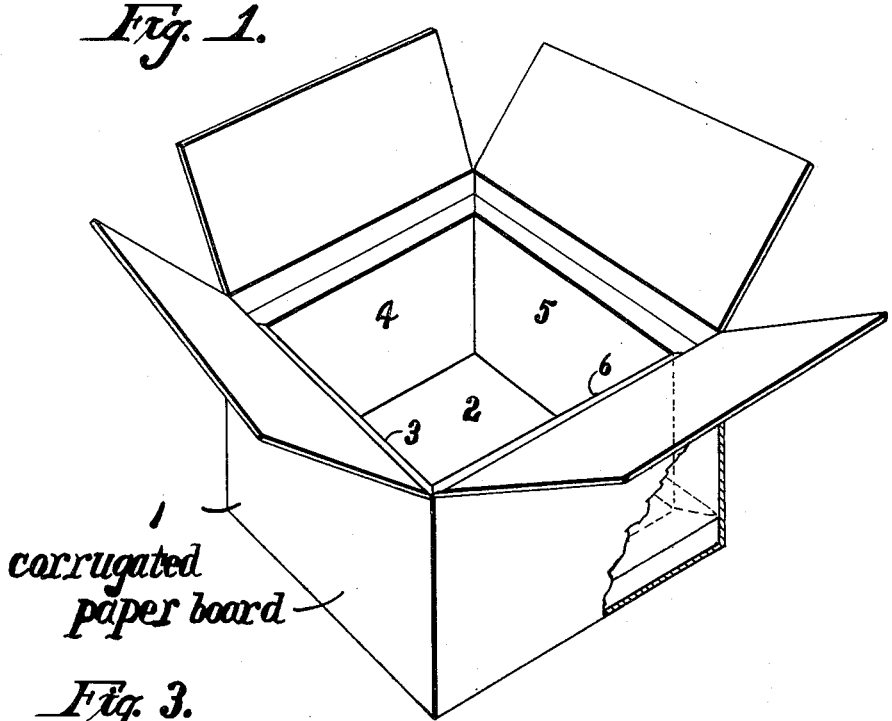
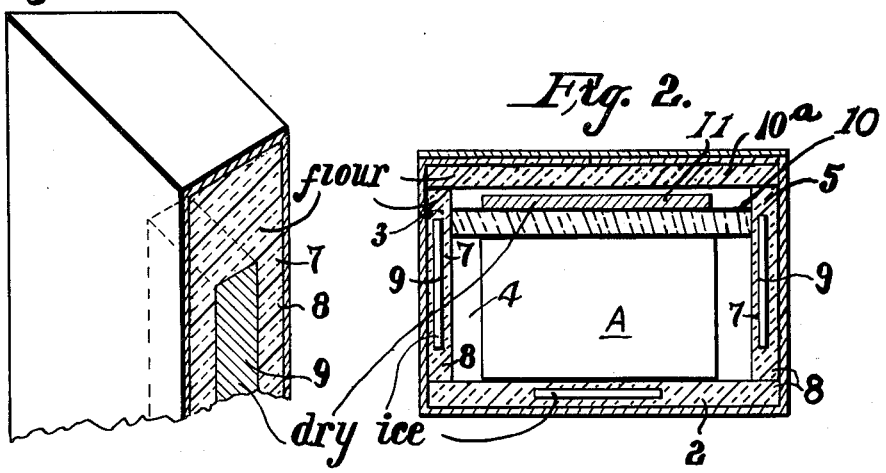

2,289,060

UNITED STATES PATENT OFFICE 2,289,060

METHOD OF AND APPARATUS FOR UTILIZING DRY ICE

Gustav Merkle, Philadelphia, Pa., assignor to Merkle Corporation, Philadelphia, Pa., a corporation of Pennsylvania Application March 12, 1940, Serial No. 323,504

6 Claims. (Cl. 62—1)

My invention is a method of and means for controlling the refrigerating action of solidified carbon dioxide, commonly called dry ice, so as to prolong the refrigerating action but modify the intensity thereof.

While dry ice is widely used in the packaging of frozen comestibles, such as ice cream, its action thereon is objectionable because of the extreme intensity of the refrigerating action which freezes articles so hard as to impair their quality and render them unusable without thawing. The use of usual insulating materials have proven of little or no value in ameliorating such conditions. I have discovered that the refrigerating action of solidified carbon dioxide may be effectively controlled by placing a pad containing dry flour between the solidified carbon dioxide and the article to be refrigerated or by burying the solidified carbon dioxide in a package containing dry flour. By flour I mean the fine and soft powder which is produced ordinarily by bolting finely ground meal of grains, beans, tubers, or similar vegetable products, such for instance as rye flour, rice flour, wheat flour, soya bean flour, potato flour and tapioca flour. The flour is readily and rapidly chilled by the action of the solidified carbon dioxide to a temperature below freezing but above the temperature of the solidified carbon dioxide, and when so chilled absorbs heat from comestibles or other products to be refrigerated which are in contact therewith or adjacent thereto but prevents the intense action of the solidified carbon dioxide and retards the evaporation thereof. For instance, when the comestible contents of an ice cream carton is shielded by a packet of dry flour from the direct action of solidified carbon dioxide, the ice cream will be maintained at a desired edible consistency for approximately twenty hours by a slab or slabs of dry ice which under like conditions omitting the flour would freeze the ice cream into a solid rock-like mass for approximately sixteen hours and then permit it to rapidly melt.

I have found that flours which are relatively heavy in proportion to their volume are generally most efficacious, and I therefore prefer to use rye flour or other of the so-called heavy flours. Apparently the compaction together of the fine particles of heavy flour desirably limits, without preventing, infiltration of the liberated cold $CO_2$ gas to the food compartment. Where greater chilling effect is desired this is attainable by the use of lighter flour or the dilution of the flour mass with dry granular material, such as brewers spent grain, chaff, hulls or shells or similar coarsely ground material, so that the liberated cold $CO_2$ gas more freely diffuses therethrough.

My discovery may be utilized under a wide variety of conditions and in refrigerating units or packages of various forms, and the accompanying drawing is designed to illustrate merely one embodiment of my invention.

In the drawing, Fig. 1 is a perspective view of a package suitable for the storage and shipment of ice cream embodying my invention; Fig. 2 is a transverse sectional view of the package; and Fig. 3 is an enlarged fragmentary perspective view partly in section of one of the pads used in the package shown in Figs. 1 and 2.

As illustrated in the drawing, a corrugated paper carton 1 has its sides and bottom lined with pads 2, 3, 4, 5 and 6, each consisting of a paper or fabric bag 7 having parallel sides and containing dry flour 8 in which is embedded a cake of dry ice 9 spaced from the walls of the pads. If desired, the ends of the pads 3, 4, 5 and 6 may be bevelled so that they fit closely together at the corners of the package. When the ice cream or other comestible A has been placed in the package, a pad 10 containing dry flour may be placed over the food chamber, a block of dry ice 11 deposited thereon, and a pad 10a containing dry flour superposed on the dry ice.

I have found that by the use of flour I may effect a very considerable saving in the quantity of dry ice required for keeping the comestible suitably refrigerated for a given time and that the comestible is maintained throughout such period at a consistency suitable for eating, being neither too hard nor too soft.

Ice cream hardened beyond eating consistency in the bunker rooms of ice cream manufactories may be packaged in accordance with my invention and will, within a short time, become defrosted or softened to a uniform consistency throughout so that it may be readily cut and eaten and will retain such eating consistency uniformly throughout the mass until the dry ice has completely evaporated; whereas the omission of the regulator formed by the dry flour will cause the dry ice to so harden the ice cream as to render the serving or consumption thereof impracticable.

Having described my invention, I claim:

1. A container comprising a receptacle containing a chamber and a partition dividing said chamber into a compartment for an intense refrigerant and a compartment for a readily perishable article detrimentally affected by direct refrigerating action of such refrigerant, said partition preventing general convection circulation between said compartments and comprising a layer of powdery vegetable flour of low thermal conductivity controlling heat transfer from said article to said refrigerant.

2. A container comprising a receptacle containing a chamber and a partition dividing such chamber into a compartment for solidified carbon dioxide and an adjacent compartment for a readily perishable article detrimentally affected by direct refrigerant action of solidified carbon dioxide, said partition including a thin layer of dry, fine, soft powdery vegetable flour of low thermal conductivity from the group consisting of grain, bean, and tuber flours.

3. A portable refrigerating unit comprising solidified carbon dioxide between insulating devices comprising pads containing layers of dry, fine, soft powdery vegetable flour of low thermal conductivity from the group consisting of grain, bean and tuber flours.

4. A shipping package comprising a receptacle containing a chamber and a partition dividing said chamber into a plurality of compartments, said partition containing and said compartments being surrounded by layers of dry powdery vegetable flour of low thermal conductivity from the group consisting of grain flour, bean flour and tuber flour and having chaff interspersed therein.

5. The method of controlling the refrigerating action of solidified carbon dioxide on a perishable product detrimentally affected by direct action of solidified carbon dioxide which comprises positioning a layer of dry, powdery vegetable flour of low heat conductivity in heat transferring relation to solidified carbon dioxide and thereby reducing the temperature of the flour below the freezing point of the product aforesaid and positioning the perishable product aforesaid in heat transferring relation to the flour layer which shields the product from direct convection currents to the solidified carbon dioxide.

6. A shipping package containing a comestible compartment and a dry ice compartment, said compartments being separated from one another by, and each being surrounded by, a dry mixture of brewers' grain and heavy vegetable flour of the character described.

GUSTAV MERKLE.